United States Patent [19]

Williams et al.

[11] Patent Number: 4,905,628
[45] Date of Patent: Mar. 6, 1990

[54] PEN FOR ROOSTING FOWL

[75] Inventors: Thomas D. Williams; Roger Williams, both of Miami, Fla.

[73] Assignee: Quail Roost Quail Farms, Miami, Fla.

[21] Appl. No.: 148,516

[22] Filed: Jan. 26, 1988

[51] Int. Cl.⁴ .................. A01K 1/10; A01K 31/16; A01K 39/014
[52] U.S. Cl. .................................. 119/21; 119/48
[58] Field of Search .............. 119/17, 18, 21, 22, 119/48, 51 R, 63

[56] References Cited

U.S. PATENT DOCUMENTS 4,541,362  9/1985  Dehls ........................... 119/51 R Primary Examiner—Paul J. Hirsch
Attorney, Agent, or Firm—Wegner & Bretschneider

[57] ABSTRACT

A pen useful for raising roosting fowl from the chick stage through maturity. The pen includes a floor which is pivotable between a first, closed position and a second, open position in which eggs from the fowl can pass out of the pen. The front of the pen includes a feed trough, the wall of which is provided with apertures permitting chicks to enter the feed trough when the floor is in the closed position. The apertures are blocked off when the floor is in the open position.

25 Claims, 4 Drawing Sheets

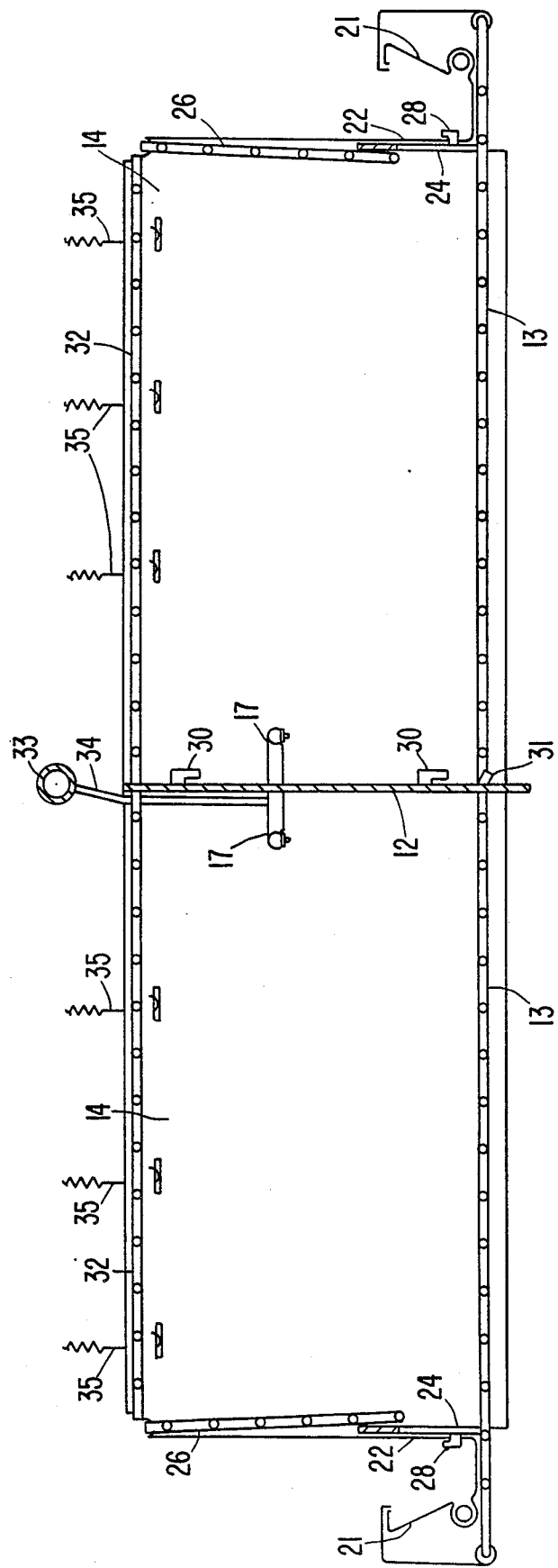

PEN FOR ROOSTING FOWL

The present invention is directed to a pen for raising roosting fowl. The pen can be used as either an individual unit or, more preferably, as part of a "battery" including a number of pens. The pen is particularly useful for the process of raising fowl disclosed in our copending application Ser. No. 719,865 filed Apr. 4, 1985, now U.S. Pat. No. 4,721,062 the disclosure of which is incorporated herein by reference.

Equipment presently available for raising roosting fowl necessitates the use of several different pens. Chicks are raised in several intermediate brooders and then transferred to pens. Hens raised for laying eggs must be separated and kept in cages separate from the fowl being raised for meat. These transferring steps are highly labor intensive, increasing the cost of raising fowl. It is thus an object of this invention to provide a pen which can be used for raising fowl from the chick stage through harvest.

BRIEF DESCRIPTION OF THE DRAWINGS

FIG. 2 is a sectional view of two pens arranged back-to-back, as in a battery of cages;

DETAILED DESCRIPTION

Figure 1:
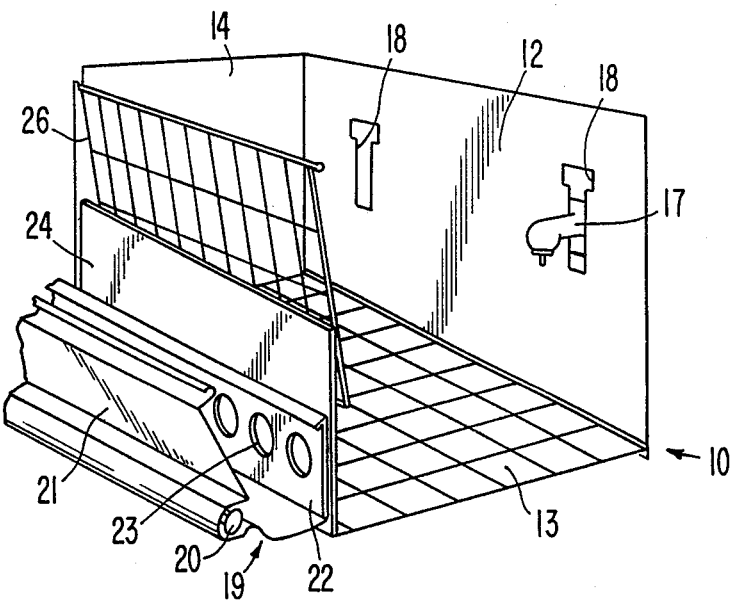
FIG. 1 is a perspective view of a pen according to the present invention.

Referring to FIG. 1, the pen 10 of the present invention has a back 12, a floor 13 and side wall 14. The other side wall is not shown in this figure so that details of the pen can be shown. Nipple watering device 17 rides in slot 18, and is vertically adjustable with respect to the wall. The slots 18 are provided with an enlarged upper section to enable the insertion of the watering devices. The watering devices are commonly used in the raising of fowl.

Feed trough 19 is carried by the side walls. An automatic feeding device 20 is carried in the first (outer) wall portion 21 of the feed trough. A second (inner) wall portion 22 of the trough is provided with openings 23 which permit chicks to pass from the interior of the pen to the feed trough. The automatic feeding device essentially includes a cable to which a number of disks are attached. When the cable passes through a feed hopper, feed is picked up and carried between the disks to the fee trough. Such devices are made by the H. W. Hart Mfg. Co., Glendale, California, Model AF-2-20. plate 24 is capable of either closing or permitting access to the openings 23. Door 26 is hinged to the side wall and rests agains the top of the plate. Both the floor and the door preferably are made of a wire mesh material. It is preferred that the back and side walls be solid, for example 1/16" galvanized sheet metal. This makes it more difficult for fowl in adjoining pens to see each other, which tends to prevent a disturbance in one pen from being transmitted to other pens in the battery. The plate 24 can be made of a similar material.

Referring to FIG. 2, further construction details can be seen. The side wall 14 is provided with tab 28 which engages a slot in the second wall portion 22 of the feed trough. The side wall also is provided with tab 30, which extends through a slot in the back 12. When arrangement in a battery is contemplated, as shown in FIG. 2, the slot in the back wall should be wide enough to accommodate tabs from two side walls side-by-side. Thus, the tab 30 from one of the side walls 14 extends through the common back and is adjacent the body of the other side wall 14.

The pen is provided with a ceiling 32, preferably of mesh. Main pipe 33 provides water to the nipple watering device 17 through flexible supply tube 34, which passes through the ceiling. Only one supply tube is needed for each watering device. The flexible tube can be run down either side of the back 12. Hangers 35 cooperate with openings in the side walls and back, and are used for suspending the pen from a support frame.

The floor 13 is secured for pivotal movement with respect to the back and side walls. This can be accomplished by providing the floor with protrusions 31 which extend through openings in the back wall. Thus, the floor 13 pivots about a horizontal axis which lies in the vicinity of the back 12. Of course, it would be possible to accomplish the same effect through engagement with the side wall When a battery of pens is used, the opening in the back wall should be sufficient to accommodate the protrusions from both of the floor members.

Figure 3:
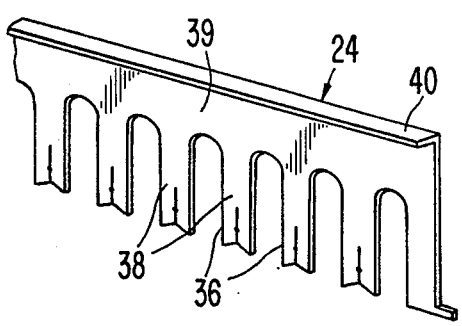
FIG. 3 is a perspective view of the feed trough access plate used in the present pen.

FIG. 3 shows the feed trough access plate 24. The plate is provided with slots 36 separated by legs 38. Above the slotted area is a solid area 39 which is used to block the trough access openings 23. The top of the plate 24 is bent to form an upper lip 40, which cooperates with second wall portion 22 of the feed trough in a manner discussed below.

Figure 4:
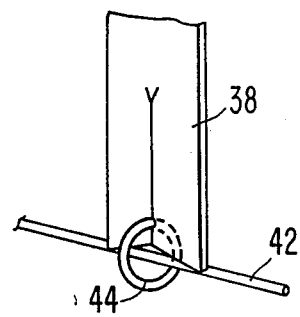
FIG. 4 shows details of a leg of the access plate and its engagement with the floor of the pen.

Referring to FIG. 4, it can be seen that the bottom portions of the legs 38 are crimped to form a V-shape, with the point of the V being directed toward the interior of the pen. The plate legs 38 can be secured to one of the cross wires 42 of the mesh floor by means of a galvanized metal hog ring 44, which passes through an opening in the leg.

Figure 5:
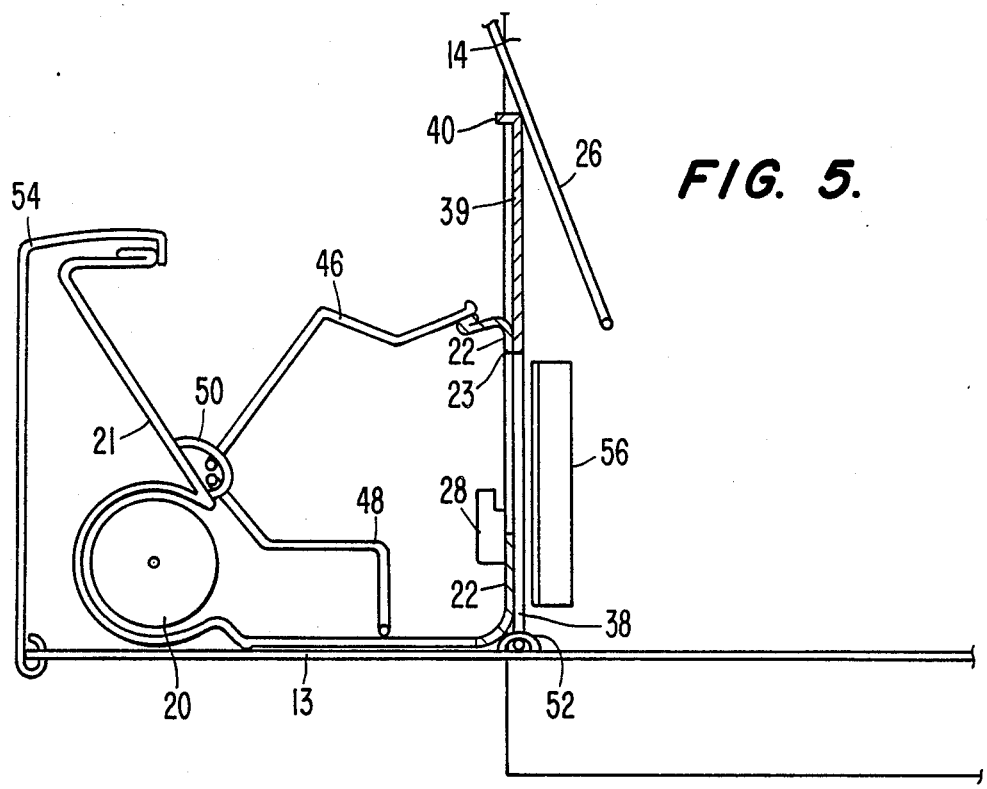
FIG. 5 is a side view of the feed trough of the present pen with the access plate and trough wall shown in section to illustrate the relationship of the openings, with the floor in the closed position.

FIG. 5 shows details of the feed trough with the floor in its upper closed position. The floor is held in this position by means of hook 54, which engages the lip of the feed trough first wall portion 21. In the closed position, the floor contacts or nearly contacts the bottom of the feed trough 19 so that young birds cannot escape between the floor and the bottom of the feed trough. In this position, the slots of plate 24 are in registry with the trough openings 23, permitting chicks in the interior of the pen access to the feed trough through opening 23.

The feed trough is provided with a chick escape gate 46, which is pivotably mounted to the feed trough via eyelet 50, which cooperates with a protrusion on the gate 46. The escape gate can be made of wire mesh, and is provided with a bent configuration which allows the gate to remain in the open position (FIG. 6) without the need of an additional restraining device.

Figure 8:
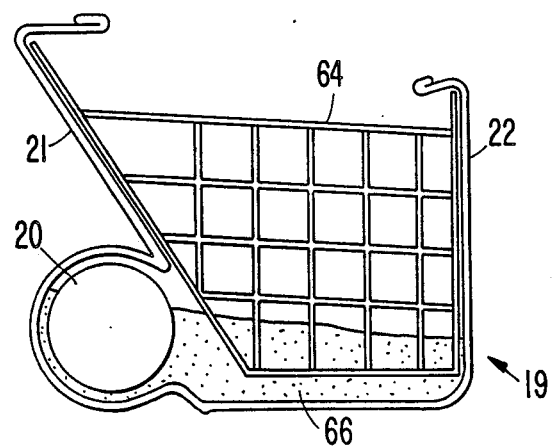
FIG. 8 shows a side view of the feed trough, illustrating an end guard.

The trough is also provided with a wire mesh feed guard 48, which is pivotally mounted in eyelet 50. The feed guard is intended to prevent birds from entering the auto feeder, while permitting them access to the feed. The feed guard can be pivoted up to allow access to the feeder for servicing. As shown in FIG. 8, the trough for each pen is provided at its ends with a wire mesh end guard 64, which can be snapped into place under the lips of trough walls 21 and 22. The guard 64 extends beneath the level of the feed 66 delivered by automatic feeding device 20. This prevents chicks from moving between pens through the feed trough. The escape gate 46, feed guard 48 and eyelet 50 have been omitted from FIG. 8 for clarity.

The floor 13 can be provided with an eyelet 52 which cooperates with a protrusion on plate 24. This, along with the ring engagement between the legs 38 and the floor wire, permits variations in t he angle between the plate and the floor. The substantially vertical orientation of the plate is maintained through the use of slide guide 56, which is secured to the side wall. The slide guide has an L-shaped configuration, with the free end extending from the side wall. The slide guide is located above the uppermost position of the floor and below the lowermost reach of the door.

Figure 6:
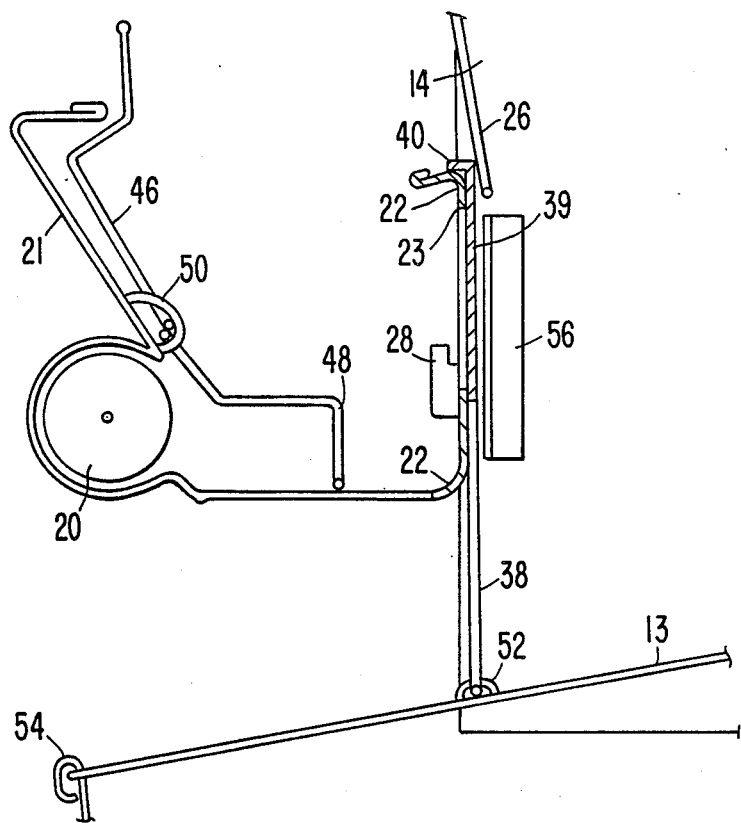
FIG. 6 is a view similar to FIG. 5, but with the floor in the open position.

Turning now to FIG. 6, it can be seen that the floor has bee unhooked from first wall portion 21 and allowed to descend to the open position. Plate 24 moves downwardly with the floor, so that solid portion 39 now prevents access to the openings 23. Door 26 still rests against the top portion of the plate. Further downward movement of the floor is prevented by the engagement of lip 40 with the top of the second wall portion 22. The escape gate 46 is moved open (manually), and the more mature birds now feed over the top o±the plate lip 40 and second wall portion 22, through the openings in the door mesh. The floor now is spaced from the trough a distance sufficient to permit eggs to roll out of the pen, yet insufficient to permit the birds to escape from the pen. In this regard, providing the plate with a plurality of slots as shown. rather than with one long, continuous opening, helps prevent escape of the fowl. The V-shaped crimp in the bottom of legs 38 facilitates the passage of eggs from the pen by directing the eggs toward the slots 36. Any eggs that would happen to stop directly on the point of the V will be dislodged by movement of the fowl in the pen. An egg conveyor can be located at the end of the floor to carry the eggs away automatically.

Figure 7:
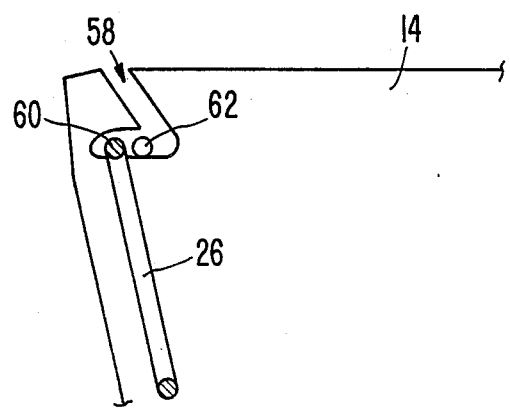
FIG. 7 shows details of the hinging of the pen door to the side wall.

Referring to FIG. 7, the mounting of the door will now be described. It can be seen that side wall 14 is provided with a hinge passage, to which the door is engaged through protrusion 60. In the case of a battery arrangement in which adjacent pens share a common side wall, the passage also will accept the protrusion 62 from the neighboring pen's door. As noted above, the bottom of the door rests against the top of plate 24. Passage 58 extends forwardly a distance so that the protrusion 60 (and also 62 in the case of a battery arrangement) is above, or more preferably, slightly forward of the plate. As a result, the force of gravity tends to keep the door in contact with the plate, i.e., in the closed position. Thus, special locking devices are not necessary, and the door can be opened through the simple application of pressure to the outside of the door, causing it to swing inwardly. This provides convenient access to the interior of the pen. It also should be noted that the passage 58 is dimensioned so that one door can be removed without the necessity of removing the door of the adjoining pen completely from the passageway.

Figure 9:
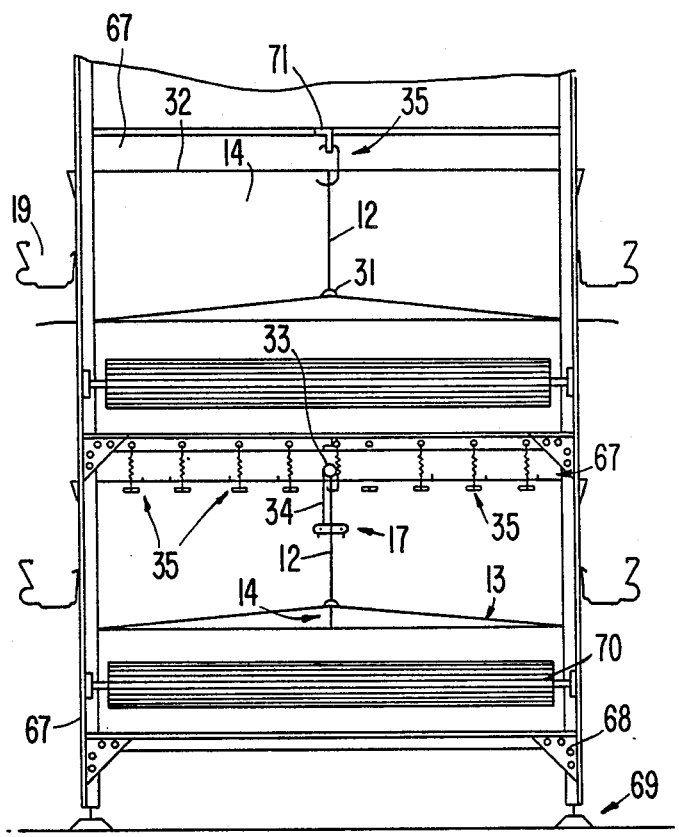
FIG. 9 shows a side view of a frame structure useful in supporting a battery of pens.

The pen of the present invention can be readily assembled in a battery configuration, as shown in FIG. 9. The battery would include a number of tiers of pens, with each tier including a row of pairs of pens arranged back-to-back, with each pen having a common side wall with its neighbor. To construct such a battery, a support structure is erected in the form of a plurality of H-frame members 67 joined by cross members 71. Angle braces 68 also may be provided for stability, as well as levellers 69. The support structure carries the rollers 70 for a waste conveyor which runs underneath each tier of cages. After construction of the frame, the rollers 70 and the main water pipes 33 would be added to the structure. Next, the common back, which extends the length of the battery, is hung from the support frame. For ease of handling the back may be provided in sections of an easily-handled length, such as 10 feet. The side walls are then suspended from the support frame and secured to the back, for example, with the tab and slot arrangement shown in FIG. 2. The frame can include horizontal members extending from cross member 71 in locations between the vertical members of the H-frame to support common side walls for adjoining pens. It should be noted that common side walls will not be used at the locations of the vertical members of the frame. One side wall is provided on each side of the vertical member. The mesh ceilings are then installed, secured to the side walls and back with hog rings. Next, the feeding trough is added. Finally, the floor, with plate 24, is installed, followed by the watering system and the pen doors.

It should be noted that for convenience, the feed troughs for several pens may be in the form of a single unit. Thus, for example, the feed troughs may be provided in ten foot lengths. A battery of pens for quail conveniently may be six tiers high, and extend for lengths of four hundred feet or more.

The present pen is believed to be useful for raising any type of roosting fowl. For the purposes of illustration, dimensions of a pen useful for raising quail are described below. It will, of course, be understood that the dimensions would be altered, depending upon the specific type of fowl being raised. The cage can be 20" long×20" wide and have a height of about 10" with the floor in the closed position. The space between the floor and the bottom of the trough in the open position is about 1", which causes the floor to incline downwardly from back to front. The second wall portion 21 is about $2\frac{1}{2}$" high, with the plate 24 having a total height of about $3\frac{1}{2}$". The openings 23 can be about $1\frac{1}{8}$" in diameter. The first (outer) wall portion of the trough is slightly higher than the second (inner) wall portion 22. The floor, feed guard, escape gate and end guard can all be made of $\frac{1}{2}$"×1" wire mesh. The ceiling can be made of 1"×4" wire mesh, while the door can be made of 1"×5" wire mesh, although 1"×4" wire mesh would be acceptable if the 1"×5" wire mesh is not available. For a pen of the above dimensions, two watering devices are sufficient, and two hooks should be adequate to support the floor from the feed trough in the closed position. Using the process of our copending application, about 18 quail can be raised in a pen such as described above.

The present pen eliminates the need for intermediate brooding pens for chicks, and also eliminates the need for different style pens for layers and pullets. The fowl are handled only twice. Chicks are transferred from the hatcher to the pen and then not removed from the pen until harvest.

At the time the chicks are transferred to the pen, it is desirable to provide a layer of paper matting on the pen floor. It is desirable to use a thin (about 0.05″) paper which is layered to have a spongy, resilient quality. This promotes good footing and enables the growing chicks to develop their legs and feet properly. The paper also should be absorbent to promote cleanliness. It also is desirable for the paper to disintegrate after about a week or so under the mechanical action of the birds exercising their legs and the chemical action of the urea in the birds' waste. A suitable paper presently is sold by Kimberly-Clark under the name "Cushioning Surface Protection Soakers", designation K-34 and K-35.

At the time the chicks are initially transferred to the pen, the floor is in the upper, closed position, and the chicks have access to the feed trough through the slots 36 and openings 23. At this time, the escape gate 46 is in the closed position. After four weeks, the cage floor is unhooked from the trough and allowed to descend to the open position. The more mature birds then have access to the feed trough through the door mesh and over the top of the plate and the second wall portion of the trough. The four-week period is applicable to quail. The period will be adjusted according to the fowl being raised.

During the growth period for the fowl, the level of the watering devices is gradually raised. This can be accomplished by providing a cable which runs the length of the battery and providing individual cables from each watering device to the main cable, through the mesh ceiling. The main cable will be attached to a winch. Horizontal movement of the main cable will pull the cables of the individual watering devices, causing them to bear against the wires of the mesh and thus pull the watering devices upwards.

Although a detailed description has been provided above, the present invention is not limited thereto. Modifications will be apparent to those skilled in the art, which do not depart from this invention, the scope of which is defined by the following claims.

What is claimed is:

1. A pen for roosting fowl, comprising:
   a back;
   first and second side walls;
   a front; and
   a bottom secured for pivotable movement about a horizontal axis in the vicinity of the back, the bottom being pivotable between a first position in which the bottom is adjacent the front and a second position in which the bottom is spaced from the front a distance sufficient to allow eggs from the roosting fowl to pass beneath the front and outside of the cage.

2. The pen of claim 1, wherein in the second position the floor is inclined downwardly from back to front.

3. The pen of claim 1, wherein the front comprises a feed trough.

4. The pen of claim 3, wherein the feed trough comprises a first wall portion defining an outer side of the trough and a second wall portion which defines an inner side of the trough and faces the back of the pen, said second wall portion being provided with openings permitting access to the feed trough from the interior of the pen, the pen further comprising a plate adjacent to the second wall portion, movable between a first position in which the openings in the second wall portion are unblocked and a second position in which the openings of the second wall portion are blocked.

5. The pen of claim 4, wherein the plate is secured to the floor and moves with the floor, the plate being provided with openings which are in registry with the openings of the second wall portion when the floor and plate are in their first positions, the plate being provided with a solid portion which blocks the openings of the second wall portion when the floor and plate are in their second positions.

6. The pen of claim 3, wherein the feed trough comprises feed delivery means.

7. The pen of claim 6, wherein the feed trough further comprises a feed guard having openings large enough to permit fowl to feed from the feed delivery means but small enough to keep the fowl out of the feed delivery means.

8. The pen of claim 3, wherein the feed trough comprises a chick escape guard.

9. The pen of claim 8, wherein the chick escape guard is movable between a first position preventing fowl from escaping from the feed trough and an open second position.

10. The pen of claim 9, wherein the chick escape guard is pivotally secured to the first wall portion of the feed trough.

11. The pen of claim 5, wherein the plate is provided with a plurality of slots separated by a plurality of legs having free ends.

12. The pen of claim 11, wherein the free ends are V-shaped in lateral cross-section.

13. The pen of claim 5, further comprising means for releasably engaging the floor and the first wall portion of the feed trough to hold the floor in the first position.

14. The pen of claim 13, wherein in the second position the plate engages the second wall portion to hold the floor in the second position.

15. The pen of claim 3, wherein the feed trough is secured to said side walls.

16. The pen of claim 5, wherein the front comprises a door.

17. The pen of claim 16, wherein the door opens inwardly and pivots about a horizontal axis.

18. The pen of claim 17, wherein the door closes against said plate and is pivotably retained in passages in said side walls, the passages having a door retaining portion located directly above the plate or outside of the pen with respect to the plate.

19. The pen of claim 18, wherein the passage has an open end.

20. The pen of claim 19, wherein the passage is dimensioned so that one of two doors sharing the passage can be removed while the other remains in the passage.

21. The pen of claim 1, further comprising means for delivering water to birds in the pen.

22. The pen of claim 21, wherein the means for delivering water is vertically adjustably secured to the back.

23. The pen of claim 18, wherein the door is provided with openings and the vertical extent of the second wall portion and the plate in the second position is small enough to permit mature birds to reach the feed trough over the plate and the second wall portion.

24. A pen for roosting fowl, comprising:
   a back;
   first and second side walls;
   a front comprising a feed trough which comprises a first wall portion defining an outer side of the trough and a second wall portion which defines an inner side of the trough and faces the back, said second wall portion having openings permitting access to the feed trough from the interior of the pen; and a plate adjacent to the second wall portion, movable between a first position in which the openings are unblocked and a second position in which the openings are blocked.

25. A battery of pens for raising roosting fowl, comprising:

a common back having first and second faces, extending substantially the length of the battery;

a plurality of side walls extending out from the first and second faces;

a plurality of floor members secured for pivotal rotation at the common back, capable of pivoting between a first position in which the floor is adjacent the outer most portion of the lower edge of the side walls and a second position spaced downwardly from the first position with respect to the outermost portion of the lower edge of the side walls.

* * * * *